US010416946B1

(12) United States Patent
Cronin

(10) Patent No.: US 10,416,946 B1
(45) Date of Patent: Sep. 17, 2019

(54) WEARABLE COMPUTER USING PROGRAMMED LOCAL TAG

(71) Applicant: SONY INTERACTIVE ENTERTAINMENT AMERICA LLC, San Mateo, CA (US)

(72) Inventor: John Cronin, Williston, VT (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 16/425,786

(22) Filed: May 29, 2019

Related U.S. Application Data

(63) Continuation of application No. 16/031,690, filed on Jul. 10, 2018, now Pat. No. 10,318,223, which is a continuation of application No. 15/695,636, filed on Sep. 5, 2017, now Pat. No. 10,019,214, which is a continuation of application No. 14/460,282, filed on Aug. 14, 2014, now Pat. No. 9,753,687, which is a continuation of application No. 14/147,440, filed on Jan. 3, 2014, now abandoned.

(51) Int. Cl.
*G06F 3/14* (2006.01)
*G02B 27/01* (2006.01)
*G06F 3/147* (2006.01)
*G06F 1/16* (2006.01)

(52) U.S. Cl.
CPC .............. *G06F 3/14* (2013.01); *G02B 27/017* (2013.01); *G06F 1/163* (2013.01); *G06F 3/147* (2013.01); *G09G 2340/12* (2013.01); *G09G 2354/00* (2013.01)

(58) Field of Classification Search
USPC ........................................................ 235/375
See application file for complete search history.

(56) References Cited

U.S. PATENT DOCUMENTS

| 9,753,687 | B1 | 9/2017 | Cronin |
| 9,818,004 | B1* | 11/2017 | Rezayee .............. G06K 7/0095 |
| 10,019,214 | B2 | 7/2018 | Cronin |
| 10,318,223 | B2 | 6/2019 | Cronin |
| 2006/0055804 | A1 | 3/2006 | Arai et al. |

(Continued)

OTHER PUBLICATIONS

U.S. Appl. No. 14/460,282 Office Action dated Mar. 18, 2016.

*Primary Examiner* — Michael G Lee
*Assistant Examiner* — David Tardif
(74) *Attorney, Agent, or Firm* — Polsinelli LLP

(57) ABSTRACT

A wearable computing device includes a head-mounted display (HMD) that provides a field of view in which at least a portion of the environment of the wearable computing device is viewable. The HMD is operable to display images superimposed over the field of view. When the wearable computing device determines that a target device is within its environment, the wearable computing device obtains target device information related to the target device from a programmed local tag. The target device information may include information that defines a virtual control interface for controlling the target device and an identification of a defined area of the target device on which the virtual control image is to be provided. The wearable computing device controls the HMD to display the virtual control image as an image superimposed over the defined area of the target device in the field of view.

19 Claims, 11 Drawing Sheets

(56) References Cited

U.S. PATENT DOCUMENTS

| | | |
|---|---|---|
| 2007/0036346 A1 | 2/2007 | Kwon |
| 2011/0221896 A1* | 9/2011 | Haddick .............. G02B 27/017 348/143 |
| 2015/0126845 A1* | 5/2015 | Jin ....................... G02B 27/017 600/383 |
| 2018/0074771 A1 | 3/2018 | Cronin |
| 2018/0329662 A1 | 11/2018 | Cronin |

* cited by examiner

WEARABLE COMPUTER USING PROGRAMMED LOCAL TAG

CROSS-REFERENCE TO RELATED APPLICATIONS

The present application is a continuation and claims the priority benefit of U.S. patent application Ser. No. 16/031,690 filed Jul. 10, 2018, now U.S. Pat. No. 10,318,223, which is a continuation and claims the priority benefit of U.S. patent application Ser. No. 15/695,636 filed Sep. 5, 2017, now U.S. Pat. No. 10,019,214, which is a continuation and claims the priority benefit of U.S. patent application Ser. No. 14/460,282 filed Aug. 14, 2014, now U.S. Pat. No. 9,753,687, which is a continuation and claims the priority benefit of U.S. patent application Ser. No. 14/147,440 filed Jan. 3, 2014, the disclosures of which are incorporated herein by reference.

BACKGROUND OF THE INVENTION

1. Field of Invention

The present invention relates generally to a wearable computing device that uses a programmed local tag. Specifically, the present invention relates to a wearable computing device having a head-mounted display (HMD) and a controller. The HMD provides a field of view in which at least a portion of an environment of the wearable computing device is viewable or within range.

2. Description of the Related Art

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image can be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view.

US Publication 2013/0069985 A1 by Wong et al, "Wearable computer with superimposed controls and instructions for external devices" uses a wearable computing device for determining if a target device is within view and then either learns about and the augments the reality of the target device through a service network. As described in this publication, the wearable computing device may provide the wearer with additional means by which the wearer can control the target device, provide input to the target device, receive instructions for operating the target device, receive status information regarding the target device, and/or receive other information related to the target device.

While this invention provides unique capability, it requires that the target device to be able to communicate with the server network. In many cases, the amount of information to be accessed over the server network doesn't warrant the expense of adding electronics to the target device to have it access the server network, that is a simple set of instructions, background data etc., is a limited amount of data, that really doesn't require access to the internet. What is required is a less expensive and more local means to access information of the target device.

While US Publication 2013/0069985 provides unique capability, the requirement that the target device communicate with the server network is a disadvantage as in many cases, server networks may not be available. For instance, a statue in a park may not have any ability to communicate with a server network. In many cases the target device will not have integration, or warrant, control of the target device through a server network.

Although control of a target device such as a refrigerator to dispense ice may not require access a server network to request ice and therefore it is much easier to have the user directly dispense ice. However, it may be quite useful to at least have operating instructions and other related information of the target device without need for access to the Internet.

Moreover, there maybe security issues for a general user to learn about a target device that does not want to interact with a server network. What is required is a means to have a more secure augmented enhancement without connection to a server network.

In many cases, a target device may need information created more quickly for safety reasons, that is speed of information is critical and waiting for access through the server networks through the internet may be slowed by connection speeds of web pages not responded quickly, or worse be offline. What is required is a means to augment a target device without requiring a connection to the server networks.

In other cases, target device information is annotated with other information, pop-up menus and data, advertisement and the like. This may negatively impact the user experience as well as may slow the experience down. What is required is a means to augment a target device without having ads or pop-up menus that is served by the Internet but rather obtained, if at all, only as the manufacturer or user who programs the local data requires.

In the cases contemplated by the related art, the manufactured target device includes expensive electronics for communicating with a wearable device. In many cases, the purchasers of these target devices may never use this capability and therefore is a waste. What is needed is for a simplified way to add this capability by the purchaser.

Finally, in the cases contemplated by the related art, the manufactured target device may already be manufactured and have no built-in capability. Therefore, what is needed is a simplified way to add this capability by the purchaser.

SUMMARY OF THE CLAIMED INVENTION

One embodiment of the present invention is a method for using a wearable computing device to interact within an environment. The method includes locating a programmed local tag of a target device within the environment of the wearable computing device. The wearable computing device includes a head-mounted display (HMD) that provides a field of view in which at least a portion of the environment is viewable. The wearable computing device also includes a wireless communication that can "poll" local target devices within range. In addition, the HMD is operable to display images superimposed over the field of view or within a range. The method further includes obtaining target device information related to the target device from the programmed local tag. The target device information defines a virtual control interface for either providing information of the target tag or for controlling the target device and identifies a defined area of the target device on which the virtual control interface is to be provided. The method further includes controlling the HMD to display the virtual control interface as an image is superimposed over the defined area of the target device in the field of view.

In a second aspect, a non-transitory computer readable medium is provided. The non-transitory computer readable medium has stored instructions that are executable by a computing device to cause the computing device to perform functions. The functions include:

locating a programmed local tag of a target device within a field of view provided by a see-through display controlled by the computing device;

obtaining target device information related to the target device from the programmed local tag, wherein the target device information defines a virtual control interface for controlling the target device and identifies a defined area of the target device on which the virtual control interface is to be provided; and controlling the see-through display to display the virtual control interface as an image superimposed over the defined area of the target device in the field of view.

In a third aspect, a wearable computing device is provided. The wearable computing device includes a head-mounted display (HMD) and a controller. The HMD is configured to provide a field of view in which at least a portion of an environment of the wearable computing device is viewable or within range. In addition, the HMD is operable to display images superimposed over the field of view. The controller is configured to:

locate a programmed local tag of a target device that is within the environment of the wearable computing device;

obtain target device information related to the target device from the programmed local tag, wherein the target device information defines a virtual control interface for controlling the target device and identifies a defined area of the target device on which the virtual control interface is to be provide; and control the HMD to display the virtual control interface as an image superimposed over the defined area of the target device in the field of view.

DETAILED DESCRIPTION

Figure 1:
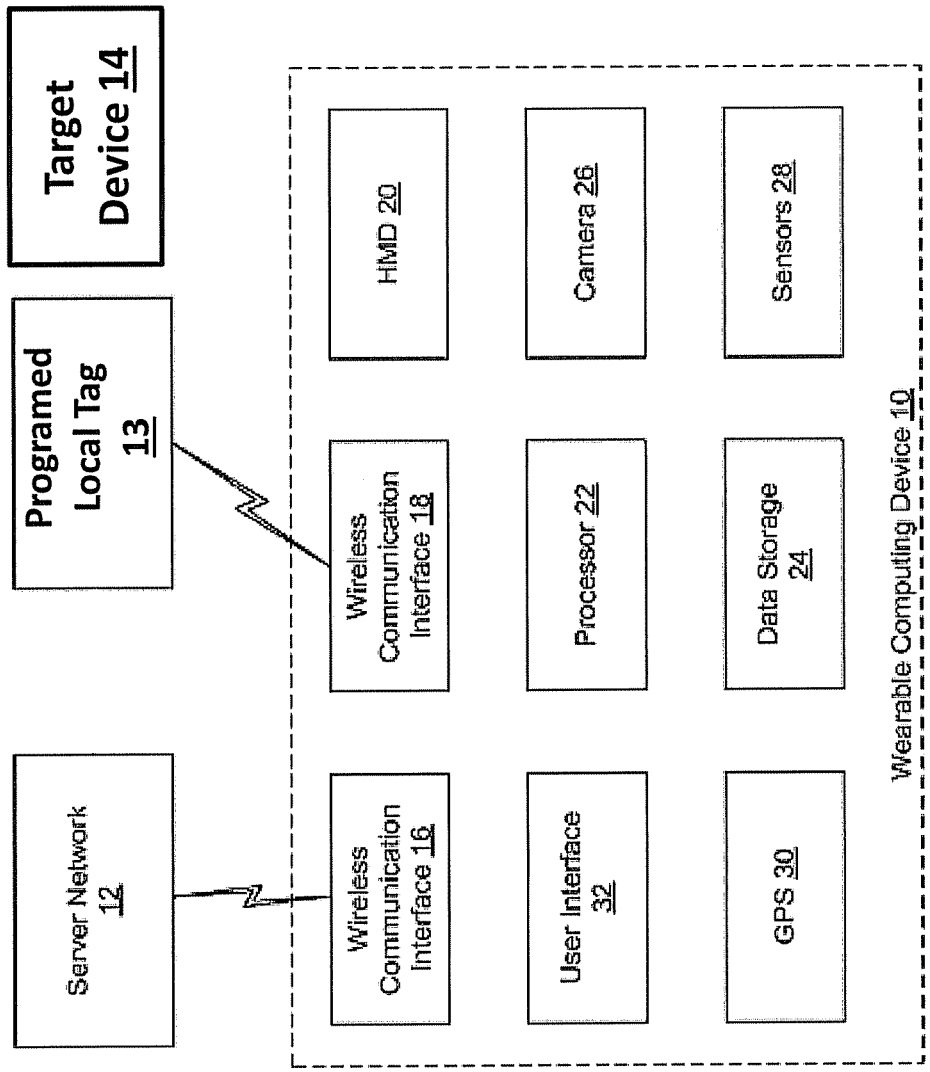
FIG. 1 is a functional block diagram of a wearable computing device in communication with a server network and a target device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

A wearable computing device may facilitate the wearer's operation of or understanding of a particular device, described herein as a "target device," that is located in the wearer's environment. The target device can be, but is not limited to any electrical, optical, or mechanical device. For example, the target device may be a home appliance, such as a refrigerator, espresso maker, television, garage door, alarm system, indoor or outdoor lighting system, or an office appliance, such as a copy machine, combinations thereof or the like. The target device may have an existing user interface that may include, for example, buttons, a touch screen, a keypad, or other controls through which the target device may receive control instructions or other input from a user. The target device's existing user interface may also include a display, indicator lights, a speaker, or other elements through which the target device may convey operating instructions, status information, or other output to the user. Alternatively, the target device may have no outwardly visible user interface. As described herein, a wearable computing device may provide the wearer with the ability to augment the target device by having preloaded data related to the target device obtained from a local and inexpensive programmed local tag.

In one example, the wearable computing device includes a head-mounted display (HMD) that enables its wearer to observe the wearer's real-world surroundings and also view a displayed image, such as a computer-generated image. In some cases, the displayed image may overlay a portion of the wearer's field of view of the real world. Thus, while the wearer of the HMD is going about his or her daily activities, such as working, walking, driving, exercising, etc., the wearer may be able to see a displayed image generated by the HMD at the same time that the wearer is looking out at his or her real-world surroundings.

The displayed image might include, for example, graphics, text, and/or video. The content of the displayed image can relate to any number of contexts, including but not limited to the wearer's current environment, an activity in which the wearer is currently engaged, the biometric status of the wearer, and any audio, video, or textual communications that are directed to the wearer. The images displayed by the HMD may also be part of an interactive user interface. Thus, the images displayed by the HMD may include menus, selection boxes, navigation icons, or other user interface features that enable the wearer to invoke functions of the wearable computing device or otherwise interact with the wearable computing device.

The HMD may include an optical system that is mounted to a head-mounted support. The optical system may be operable to present virtual images overlaid upon a real-world view to a wearer. To display a virtual image to the wearer, the optical system may include a light source, such as a light-emitting diode (LED), that is configured to illuminate a display panel, such as a liquid crystal-on-silicon (LCOS) display panel. The display panel generates light patterns by spatially modulating the light from the light source, and an image former forms a virtual image from the light pattern. Furthermore, the HMD may include a camera configured to capture images that may be similar to the wearer's field of view. The camera may be integrated into the optical system or can be mounted on, or integrated into, the head-mounted support.

The wearable computing device may control the HMD to provide an "augmented reality" experience to the wearer that facilitates the wearer's interaction with target devices. In one example, the wearable computing device detects and identifies one or more target devices that are within the wearer's environment. The wearable computing device may detect and/or identify a target device in various ways. As one example, the wearable computing device may recognize a target device by analyzing a video or one or more still images corresponding to the wearer's point-of-view. As another example, the wearable computing device may detect a beacon or other signal transmitted by the target device. The beacon or other signal could be, for example, a radio frequency signal, e.g., using WiFi, Bluetooth, or near field communication (NFC), an optical signal, such as an optical signal emitted by a visible or infrared LED on the target device, or an acoustic signal, such as an ultrasonic signal. In other examples, the wearable computing device may detect a radio frequency identification (RFID) tag on the target device or recognize an optical identification, such as a barcode or quick response (QR) code on the target device. In still other examples, the wearable computing device may determine that the location of the wearable computing device is near the known location of a target device. It is to be understood that these methods are exemplary only, as a wearable computing device may use other methods to detect and/or identify a target device in the wearer's environment. It is also to be understood that the wearable computing device may use a combination of methods to detect and/or identify a target device in the wearer's environment.

Once the target device is identified, the wearable computing device may control the HMD to display one or more images that may facilitate the wearer's interaction with and/or understanding of the target device. For example, the wearable computing device may determine that a virtual control interface is associated with the target device and then control the HMD to display the virtual control interface as an image superimposed over a defined area on the surface of the device. Thus, the virtual control interface may appear to be affixed to the target device, i.e., it stays anchored on the target device as the wearer moves. Alternatively, the HMD may display the virtual control interface so that it remains within the wearer's field of view, rather than affixed to the target device.

For example, the virtual control interface may be "head-fixed" so that it remains visible to the wearer as the wearer moves his or head (e.g., to the left or the right) regardless of whether the wearer is looking at the target device. Thus, the HMD might display a virtual control interface for a target device that is not currently within the wearer's field of view. The wearable computing device may provide operating instructions of the target device or provide target device history or provide manufacturing data or provide information related to use of the target device, etc. In this embodiment, the virtual control interface is used to navigate the data stored in a programmed local tag and does not control the target device.

In a further embodiment, to provide a virtual control interface that appears affixed to a defined area of the a target device, the wearable computing device may determine the appearance of the defined area from the perspective of the wearer's field of view and adjust the shape, size, and orientation of the image so that it corresponds to the perspective appearance of the defined area. The wearable computing device may also determine the distance to the defined area of the target device and adjust the apparent distance of the virtual control interface to match the distance to the defined area. As such, the virtual control interface may appear to the wearer as if it is on the surface of the target device in the defined area.

The virtual control interface may be displayed on the target device so as to assist the wearer in accomplishing certain tasks. For example, an indication to insert paper in a copy machine may be superimposed at the location where the paper should be inserted. As another example, graphical step-by-step instructions that assist a wearer in clearing a paper jam may be presented overlaid upon or near the physical parts of the copy machine (as viewable by the wearer) that need to be manipulated by the wearer in order to clear the paper jam. Thus, the wearable computing device may present to a wearer virtual images with content and placement location that may vary dynamically due to the environment or task context.

Further, the wearable computing device may allow for control of the data provided by the programmed local tag of the target device via interactive gestures with the virtual control interface. For example, the virtual control interface displayed by the HMD may include one or more user interface elements, such as virtual buttons, that allow the wearer to manipulate the data of the programmed local tag of the target device, such as going through menu options or paging or zooming, etc. The virtual buttons could appear to be on the surface to the target device, or they could appear in a way that is not physically connected to the target device (e.g., in a "head-fixed" virtual control interface).

The wearable computing device may recognize movement of the wearer's fingers towards a virtual button as a control instruction for the data associated with the programmed local tag of the target device. For example, the wearer may touch a location on the refrigerator where a virtual button in the virtual control interface appears and data associated with the programmed local tag of the target device location may appear. The wearable computing device may recognize this touching motion as a control instruction provide the data associated with the programmed local tag of the target device for this control.

The wearable computing device may further recognize the wearer's motions with respect to a virtual control interface located at an arbitrary position. For instance, the wearable computing device may recognize non-contact gestures towards the apparent position of the virtual control interface as control instructions for data associated with the programmed local tag of the target device. Furthermore, the wearable computing device may recognize inputs received through a user interface as control instructions for data associated with the programmed local tag of the target device. Such input may include, for example, providing data associated with the programmed local tag of a touch interaction with a touchpad, actuation of one or more buttons or keys on a keypad, or voice commands.

The wearable computing device may be communicatively coupled to a server network with wireless communication means. Furthermore, the wearable computing device may communicate with the server network in order to achieve enhanced functionality during interactions with a target device. For instance, the wearable computing device may send to the server network one or more point-of-view images from a camera mounted on the HMD. The server network may then use an image recognition algorithm to identify a target device in the one or more point-view images.

The server network may thus add to the data associated with the programmed local tag of the target device.

FIG. 1 is a functional block diagram of a wearable computing device 10 that is able to communicate with a server network 12 and a target device 14 and a programmed local tag 13. The server network 12 is a network of one or more servers and may include one or more databases or other components. The programmed local tag 13 can be any device that may be controlled or polled or interacted with, either directly or indirectly, by the wearer of wearable computing device 10. For example, and a programmed local tag 13 can be tag a that holds the data related to a household appliance or device, such as a refrigerator, television, dishwasher, audio system, video system, alarm system, thermostat, garage door, etc. Alternatively the programmed local tag 13 of a target device 14 can be tag that holds the data related to an office appliance or device, such as a copy machine, fax machine, projection system, security system, etc. Other examples of target device 14 and related programmed local tags 13 are also possible.

In one example, wearable computing device includes a wireless communication interface 16 for wirelessly communicating with server network 12 and a wireless communication interface 18 for wirelessly communicating with related programmed local tags 13 of the target device 14. Wireless communication interface 16 can use any form of wireless communication that can support bi-directional data exchange over a packet network (such as the internet). For example, wireless communication interface 16 can use 3G cellular communication, such as CDMA, EVDO, GSM/GPRS, or 4G cellular communication, such as WiMAX or LTE. Alternatively, wireless communication interface 16 can communicate with server network 12 via a wireless local area network (WLAN), for example, using WiFi.

Wireless communication interface 18 may be configured to communicate with programmed local tag 13 of target device 14 directly, for example, using an infrared link, Bluetooth, or ZigBee. Alternatively, wireless communication interface 18 may be configured to communicate with the programmed local tag 13 of target device 14 indirectly, such as through a WLAN using WiFi. The wireless communications can be uni-directional, for example, with wearable computing device 10 transmitting one or more control instructions for target device 14. Alternatively, the wireless communications can be bi-directional, so that the programmed local tag 13 of target device 14 may communicate status information of the programmed local tag 13, such as, battery life, programming status in addition to receiving control instructions.

Although FIG. 1 illustrates an example in which the wearable computing device 10 includes two wireless communication interfaces, it is to be understood that wearable computing device 10 can include one wireless communication interface that is able to communicate with both server network 12 and the programmed local tag 13 of target device 14. For example, wearable computing device 10 may be able to use WiFi, or other form of wireless communication, to access a WLAN that supports communication with both server network 12 and the programmed local tag 13 of target device 14.

The programmed local tag 13 of target device 14 does not communicate real time with server network 12 and therefore does not have expensive radios and expensive broad input out capability to the internet, however, the programmed local tag 13 of target device 14 can be preprogrammed by local connections means at the manufacturer of target device 14, or can be programmed by a third party company for assisting the target device manufacturer or the programmed local tag 13 of target device 14 may be a generic device and programmed by the user or owner of the target device 14 by downloading data locally once from the internet or other data storage locations. Like RFID and other tags, this programmed local tag 13 of target device 14 can be an "augmented data tag" and therefore it comprises a variety of related data. Programmed local tag 13 is capable of dynamic interaction to the wearable computer device or any device, such as a smartphone or other dynamic reader and viewer.

Wearable computing device 10 also includes a head-mounted display (HMD) 20. In one embodiment, HMD 20 includes a see-through display. Thus, the wearer of wearable computing device 10 may be able to look through HMD 20 and observe a portion of the real-world environment of the wearable computing device 10, i.e., in a particular field of view provided by HMD 20. In addition, HMD 20 is operable to display images that are superimposed on the field of view, for example, to provide an "augmented reality" experience. Some of the images displayed by HMD 20 may be superimposed over particular objects in the field of view, such as target device 14. However, HMD 20 may also display images that appear to hover within the field of view instead of being associated with particular objects in the field of view.

HMD 20 can be configured as, for example, eyeglasses, goggles, a helmet, a hat, a visor, a headband, or in some other form that can be supported on or from the wearer's head. Further, HMD 20 may be configured to display images to both of the wearer's eyes, for example, using two see-through displays. Alternatively, HMD 20 may include only a single see-through display and may display images to only one of the wearer's eyes, either the left eye or the right eye.

The functioning of wearable computing device 10 may be controlled by a processor 22 that executes instructions stored in a non-transitory computer readable medium, such as data storage 24. Thus, processor 22 in combination with instructions stored in data storage 24 may function as a controller of wearable computing device 10. As such, processor 22 may control HMD 20 in order to control what images are displayed by HMD 20. Processor 22 may also control wireless communication interface 16 (e.g., in order to communicate with server network 14) and wireless communication interface 18 (e.g., in order to transmit control instructions to the programmed local tag 13 of target device 14).

In addition to instructions that may be executed by processor 22, data storage 24 may store data that may facilitate interactions with the programmed local tag 13 of target devices such as target device 14. For example, data storage 24 may function as a database of information related to the programmed local tag 13 of target devices.

Such information may be used by wearable computing device 10 to identify target devices that are detected to be within the environment of wearable computing device 10 and to define what images are to be displayed by HMD 20 when target devices are identified.

In one example, the information related to a target device defines a virtual control interface that is to be displayed on the surface of the target device in a defined area. The virtual control interface may be defined in terms of its visual elements, which can appear as virtual buttons, switches, scroll bars, keys, or any other known elements for receiving input from a user. The virtual control interface may also be defined in terms of one or more control instructions for controlling the target device. For example, a particular visual element of a virtual control interface, such as a virtual button, may be associated with a particular control instruction, so that actuation of the virtual button may result in its associated control instruction being sent to the programmed local tag 13 of the target device 14.

The information the programmed local tag 13 of a target device 14 may also define other images that may be displayed, such as instructions for operating the target device. Thus, once processor 22 has identified the programmed local tag 13 of a target device 14, processor may retrieve information related to the programmed local tag 13 of the target device 14 from data storage 24 and may control HMD 20 to display images defined by the programmed local tag 13 of the target device 14 information.

Alternatively, instead of retrieving target device information from data storage 24, the processor may obtain the target device 14 information by communicating with the programmed local tag 13, for example, via wireless communication interface 16. For example, the programmed local tag 13 may either have an ID tag that allows the wearable computer to go to the internet to get information of the target device 14 or it may download a lot of data of the programmed local tag 13 of target device 14 locally.

This allows for the possibility of using dynamic data of the internet or preprogrammed data of the programmed local tag 13 of target device 14. The information of the programmed local tag 13 of target device 14 is more than for identification, such as might be stored on an RFID identification, barcode or QR code. The related art describes such identification tags as a "trigger" to get to the internet for obtaining larger amounts of data. Rather, the programmed local tag 13 of target device 14 has much more data, stored locally as may be seen on the internet such as owners manuals, history data, use data and the like. It may include videos, texts, pictures, etc. But it also can include links to the internet and in this way, the wearable device might use the links to the internet to actually in real time or in later time search the internet for data. An example is a target device that is a work of art or one of history, where the information downloaded from the programmed local tag 13 of the target device 14 can have information about the target device stored on the programmed local tag 13 of target device 14, but it also could provide links on the internet for further study.

Wearable computing device 10 may also include a camera 26 that is configured to capture images of the environment of wearable computing device 10 from a particular point-of-view. The images can be either video images or still images. The point-of-view of camera 26 may correspond to the direction where HMD 20 is facing. Thus, the point-of-view of camera 26 may substantially correspond to the field of view that HMD 20 provides to the wearer, such that the point-of-view images obtained by camera 26 may be used to determine what is visible to the wearer through HMD 20.

As described in more detail below, the point-of-view images obtained by camera 26 may be used to detect and identify target devices that are within the environment of wearable computing device 10. The image analysis can be performed by processor 22. Alternatively, processor 22 may transmit one or more point-of-view images obtained by camera 26 to server network 12, via wireless communication interface 16, for the image analysis. When server network 12 identifies a target device in a point-of-view image, server network 12 may respond with information related to the target device.

In addition to image analysis of point-of-view images obtained by camera 26, target devices, such as the programmed local tag 13 of target device 14 can be detected and identified in other ways. In this regard, wearable computing device 10 may include one or more sensors 28 for detecting when a programmed local tag 13 of target device 14 is within its environment. For example, sensors 28 may include radio frequency identification (RFID) reader that can detect an RFID tag on a target device. Alternatively or additionally, sensors 28 may include a scanner that can scan an optical code, such as a bar code or QR code, on the target device. An optical code may be detectable in visible light. Alternatively, the optical code might be detectable using infrared radiation. Further, sensors 28 may be configured to detect a particular beacon signal transmitted by a target device. The beacon signal can be, for example, a radio frequency signal, an ultrasonic signal, or an optical signal (which can be transmitted by a visible or infrared LED on the target device). Sensors 28 may further include one or more motion sensors, such as accelerometers and/or gyroscopes.

Once the device is identified by a RFID tag or QR code, etc., the data is then read from the programmed local tag 13 of target device 14, which has far more data than the RFID tag or QR code. In this way, more data can be obtained for augmentation locally or off line, especially if no internet or server network is available.

Also, even if the server network is available, information stored on the programmed local tag 13 of target device 14 is obtained more quickly for ease of use for safety reasons, and is obtained more securely since it doesn't have to go thru the internet. Moreover, information retrieved may direct the users more efficiently than a typical internet search would, and could be free of ads and off page directions.

A target device 14 can also be determined to be within the environment of wearable computing device 10 based on the location of wearable computing device 10. For example, wearable computing device 10 may include a Global Position System (GPS) receiver 30 that is able to determine the location of wearable computing device 10. Wearable computing device 10 may then compare its location to the known locations of target devices (e.g., locations stored in data storage 24) to determine when a particular target device is in the vicinity. Alternatively, wearable computing device 10 may communicate its location to server network 12, via wireless communication interface 16. Server network 12 may respond with information relating to any target devices that are nearby.

When the GPS location is known and the data of the programmed local tag 13 of target device 14 used for augmentation, server network 12 in real time or asynchronously can communicate with the internet to inform the owners of the information that data stored in the programmed local tag 13 of target device 14 was downloaded. This is useful for tracking and other related matters by the owner of the data of the local tags, for instance the amount of users downloading the programmed local tag 13 of target device 14.

Wearable computing device 10 may also include a user interface 32 for receiving input from the wearer. User interface 32 can include, for example, a touchpad, a keypad, buttons, a microphone, and/or other input devices. Processor 22 may control the functioning of wearable computing device 10 based on input received through user interface 32. For example, processor 22 may use the input to control how HMD 20 displays images or what images HMD 20 displays. Processor 22 may also recognize input received through user interface 32 as a control instruction for a target device, for example, in conjunction with a virtual control interface that HMD 20 is displaying for the target device.

Processor 22 may also recognize gestures as control instructions for a target device. Thus, while HMD 20 displays a virtual control interface for a target device, processor 22 may analyze still images or video images obtained by camera 26 to identify any gesture that corresponds to a control instruction associated with the virtual control interface. For example, if processor 22 recognizes a finger moving toward a location of the target device corresponding to where a virtual button appears in the virtual control interface, then processor 22 may recognize a control instruction associated with the virtual button. In some examples, a gesture corresponding to a control instruction may involve the wearer physically touching the target device, for example, using the wearer's finger, hand, or an object held in the wearer's hand. However, a gesture that does not involve physical contact with the target device, such as a movement of the wearer's finger, hand, or an object held in the wearer's hand, toward the target device or in the vicinity of the target device, could be recognized as a control instruction. These gestures may assist in interacting with the programmed local tag 13 of target device 14.

FIG. 1 shows various components of wearable computing device 10, i.e., wireless communication interfaces 16 and 18, processor 22, data storage 24, camera 26, sensors 28, GPS 30, and user interface 32, as being separate from HMD 20, one or more of these components can be mounted on or integrated into HMD 20. For example, camera 26 can be mounted on HMD 20, user interface 32 can be provided as a touchpad on HMD 20, processor 22 and data storage 24 can make up a computing system in HMD 20, and the other components of wearable computing device 10 can be similarly integrated into HMD 20. Alternatively, wearable computing device 10 can be provided in the form of separate devices that can be worn on or carried by the wearer. The separate devices that make up wearable computing device 10 can be communicatively coupled together in either a wired or wireless fashion.

Figure 2:
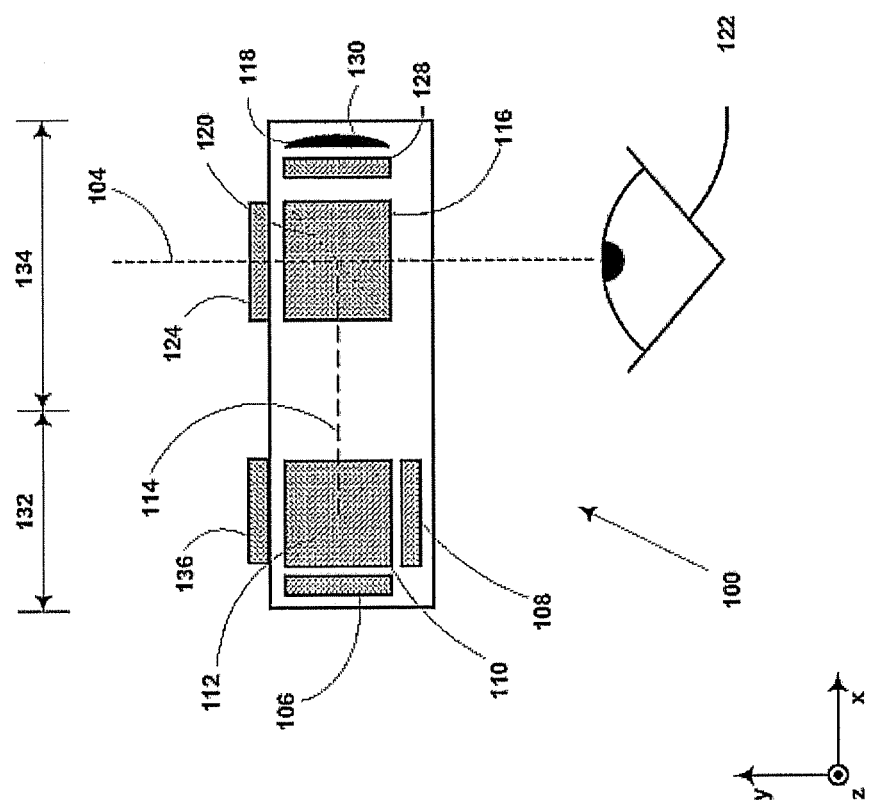
FIG. 2 is a top view of an optical system, in accordance with an example embodiment.

FIG. 2 illustrates a top view of an optical system 100 that can function as a see-through display (and may correspond to a see-through display in HMD 20). In particular, optical system 100 is configured to display a virtual image superimposed upon a real-world scene viewable along a viewing axis 104, for example, by eye 122 of the wearer. For clarity, distal portion 132 and proximal portion 134 represent optically-coupled portions of the optical system 100 that may or may not be physically separated. In the example illustrated in FIG. 2, a distal beam splitter 110 is located in the distal portion 132 and a proximal beam splitter 116 is located in the proximal portion 134. The viewing axis 104 may extend through the proximal beam splitter 116.

Distal beam splitter 110 may be optically coupled to a display panel 106 and a light source 108. The display panel 106 may be illuminated by the light source 108 via the distal beam splitter 110. The light source 108 may include one or more light-emitting diodes (LEDs) and/or laser diodes. The light source 108 may further include a linear polarizer that acts to pass one particular polarization to the rest of the optical system. In an example embodiment, the distal beam splitter 110 is a polarizing beam splitter that reflects light depending upon the polarization of light incident upon the beam splitter. Thus, s-polarized light from the light source 108 may be preferentially reflected by a distal beam-splitting interface 112 towards the display panel 106. The display panel 106 in the example embodiment is a liquid crystal-on-silicon (LCOS) display, but can also be a digital light projector (DLP) micro-mirror display, or other type of reflective display panel. The display panel 106 acts to spatially-modulate the incident light to generate a light pattern. Alternatively, the display panel 106 may be an emissive-type display such as an organic light-emitting diode (OLED) display.

In the example in which the display panel 106 is a LCOS display panel, display panel 106 generates a light pattern with a polarization substantially perpendicular to the polarization of light initially incident upon the panel. In this example embodiment, display panel 106 converts incident s-polarized light into a light pattern with p-polarization. The generated light pattern from the display panel 106 is directed towards distal beam splitter 110. The p-polarized light pattern passes through distal beam splitter 110 and is directed along optical axis 114 towards the proximal region of optical system 100. In an example embodiment, proximal beam splitter 116 is also a polarizing beam splitter. The light pattern is at least partially transmitted through the proximal beam splitter 116 to the image former 118.

In one example embodiment, image former 118 includes concave mirror 130 and quarter-wave plate 128. The light pattern passes through quarter-wave plate 128 and is reflected by concave mirror 130. The reflected light pattern passes back through quarter-wave plate 128. Through the interactions with quarter-wave plate 128 and concave mirror 130, the light patterns are converted to the s-polarization and are formed into a virtual image. Proximal beam splitting interface 120 reflects the virtual image so that is viewable along viewing axis 104.

The real-world scene is also viewable along viewing axis 104 through viewing window 124. Viewing window 124 may include a linear polarizer in order to reduce stray light within the optical system. Light from viewing window 124 is at least partially transmitted through proximal beam splitter 116. Thus, both a virtual image and a real-world image are viewable to the viewer's eye 122 through proximal beam splitter 116.

Optical system 100 can also include camera 136 that is configured to image the real-world scene that is viewable through viewing window 124. Camera 136 can, for example, be optically coupled to the distal beam splitter 110 as shown in FIG. 2. Thus, some of the light from outside entering through viewing window 124 may be reflected by proximal beam-splitting interface 120 toward distal beam splitter 110. Distal beam-splitting interface 112 may, in turn, reflect at least a portion of this outside light toward camera 136. In this way, camera 136 may be configured to image the same field of view of the outside world that is viewable by viewer's eye 122 along viewing axis 104.

FIG. 2 depicts distal portion 132 of the optical system housing as to the left of proximal portion 134 of the optical system housing when viewed from above, it is understood that other embodiments are possible to physically realize optical system 100, including distal portion 132 being configured to be to the right, below, and above with respect to proximal portion 134.

Figure 3A:
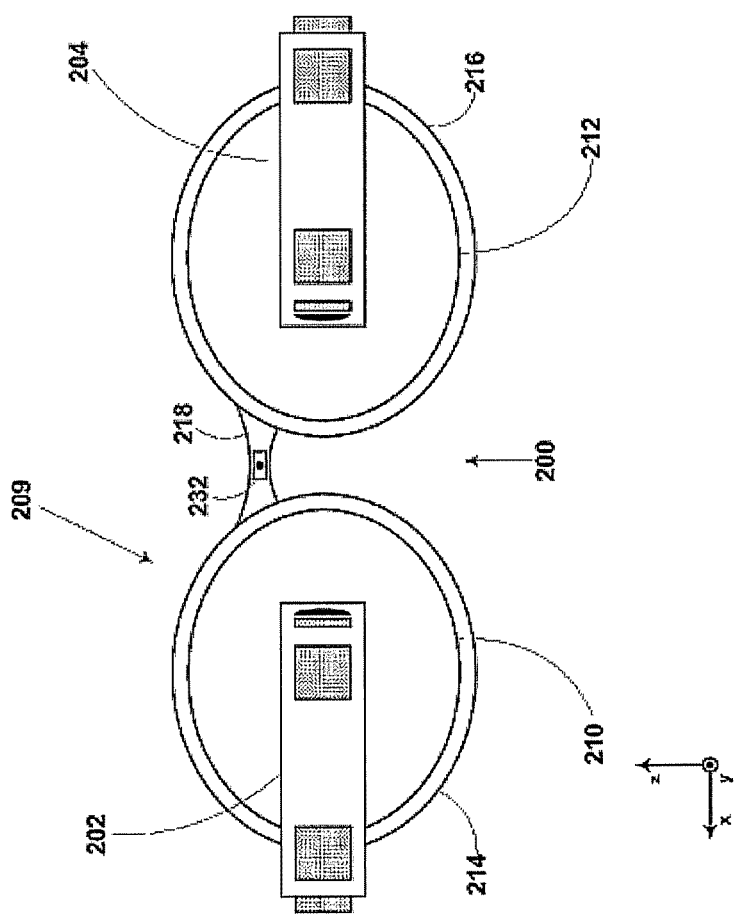
FIG. 3A is a front view of a head-mounted display, in accordance with an example embodiment.
Figure 3B:
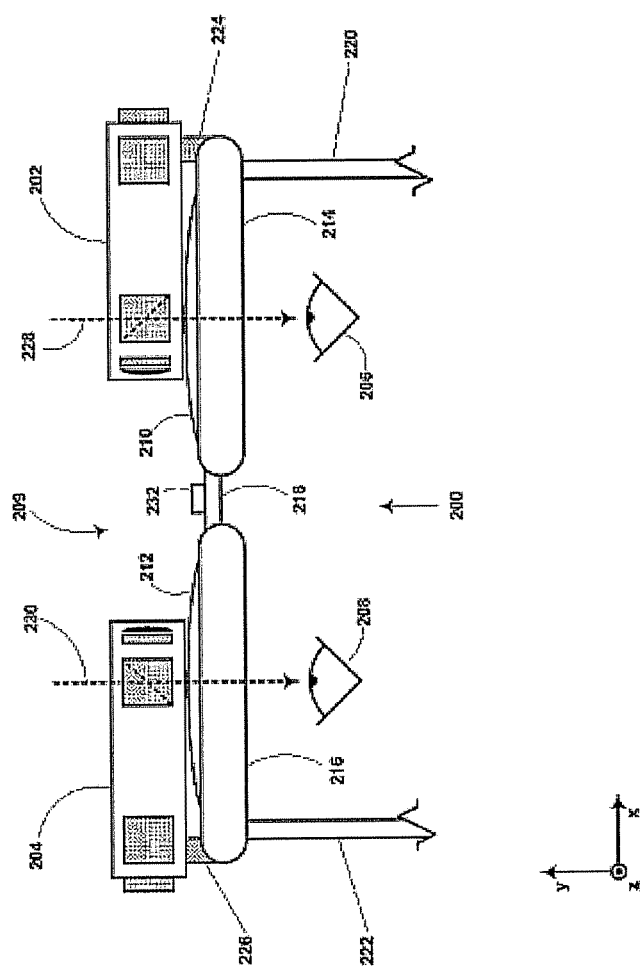
FIG. 3B is a top view of the head-mounted display of FIG. 3A, in accordance with an example embodiment.
Figure 3C:
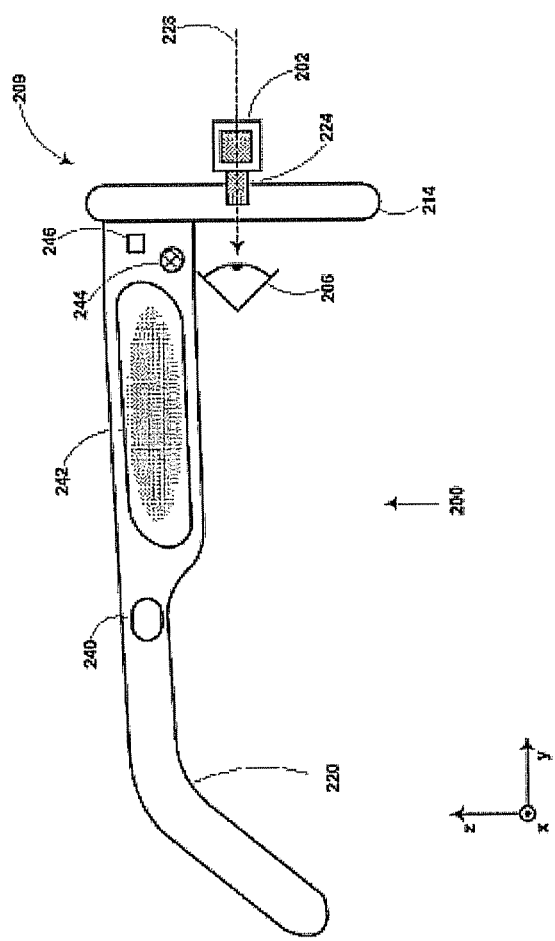
FIG. 3C is a side view of the head-mounted display of FIG. 3A and FIG. 3B, in accordance with an example embodiment.

FIGS. 3A, 3B, and 3C illustrate HMD 200 that is configured in the form of eyeglasses and includes two see-through displays that can be of the type shown in FIG. 2. FIG. 3A is a front view of HMD 200 with see-through displays 202 and 204 mounted on a head-mounted support 209. FIGS. 3B and 3C show top and side views, respectively, of HMD 200. Although the HMD is in the form of eyeglasses in this example, it is understood that HMDs may take other forms, such as hats, goggles, visors, headbands, or helmets.

Head-mounted support 209 includes lens frames 214 and 216, center frame support 218, lens elements 210 and 212, and extending side-arms 220 and 222. Center frame support 218 and side-arms 220 and 222 are preferably configured to secure head-mounted support 209 to a wearer's head via the wearer's nose and ears, respectively. Each of the frame elements 214, 216, and 218 and extending side-arms 220 and 222 may be formed of a solid structure of plastic or metal, or may be formed of a hollow structure of similar material so as to allow wiring and component interconnects to be internally routed through head-mounted support 209. Alternatively or additionally, head-mounted support 209 may support external wiring. Lens elements 210 and 212 are at least partially transparent so as to allow the wearer to look through them. In particular, the wearer's left eye 208 may look through left lens 212 and the wearer's right eye 206 may look through right lens 210. See-through displays 202 and 204, which may be configured as shown in FIG. 1, may be positioned in front of lenses 210 and 212, respectively, as shown in FIGS. 3A, 3B, and 3C. See-through displays 202 and 204 may be attached to the head-mounted support 209 using support mounts 224 and 226, respectively. Alternatively, see-through displays 202 and 204 may be integrated partially or completely into lens elements 210 and 212, respectively.

One embodiment of the present invention includes a see-through display for each of the wearer's eyes, it is to be understood that a HMD may include a see-through display for only one of the wearer's eyes (either left eye 208 or right eye 206). Further, instead of having see-through displays positioned in front of lens elements 210 and 212, a lens element can itself function as a see-through display. For example, projectors located on side-arms 220 and 222 can project images onto lens elements 210 and 212, respectively. Special coatings on lens elements 210 and 212 may reflect some of the projected light, so that the projected images may be seen in combination with the real-world view through lens elements 210 and 212. Still other types of see-through displays can be included in an HMD. Alternatively, instead of a see-through display, an HMD can include scanning laser devices that interact directly with the wearer's retinas.

HMD 200 may also include various control elements, sensors, user interfaces, and communication interfaces. In the example illustrated in FIGS. 3A, 3B, and 3C, HMD 200 includes computer 240, touchpad 242, microphone 244, button 246 and camera 232. The computer 240 may control see-through displays 202 and 204, using data from camera 232 and/or other sources to determine the virtual image that should be displayed to the wearer. Thus, HMD 200 may function as a wearable computing device. Alternatively, computer 240 can be located outside of HMD 200, for example, in a separate device that is worn or carried on the wearer of HMD 200, and may be communicatively coupled to HMD 200 through wires or through a wireless connection.

Touchpad 242, microphone 244, and button 246 may be part of a user interface through which HMD 200 receives input from the wearer. Thus, the wearer may provide input in the form of a touch interaction with touchpad 242, in the form of voice commands that are received by microphone 244, or by pressing button 246. It is to be understood that these user interface elements are exemplary only, as an HMD may include other types of user interface elements or may lack a user interface altogether.

Camera 232 may be mounted on HMD 200 so that it is able to capture point-of-view images (either still images or video images) that substantially correspond to the real-world field of view that is observable through see-through displays 202 and 204. For example, camera 232 can be located on center frame support 218 as shown in FIGS. 3A and 3B. Alternatively, camera 232 may be located elsewhere on head-mounted support 209, located separately from the HMD, or be integrated into one or both of see-through displays 202 and 204.

Camera 232 may further include a range-finder function that can determine a distance to an object, such as a target device, in its field of view. For example, camera 232 may include an ultrasonic range-finder, a laser range-finder, or an infrared range-finder. Camera 232 may further represent multiple cameras that may be integrated into the head-mounted support 209 or that may be located remote to the head-mounted support 209.

Camera 232 may image a field of view that is the same as or similar to that of wearer's eyes 206 and 208. Furthermore, computer 240 may analyze the images obtained by camera 232, in order to identify target devices or other objects in the field of view. Computer 240 can then use this information to control see-through displays 202 and 204 so that they display context-sensitive virtual images.

Computer 240 preferably detects a target device in an image obtained by camera 232. HMD 200 can then alert the user by displaying a virtual image that is designed to draw the wearer's attention to the target device. The virtual image can move in response to the wearer's movements, e.g., head movements may result in the virtual image moving around the viewable area so as to remain in a fixed position relative to the target device. Also, the wearable computing device can display instructions and introduce location and other visual cues to enhance interaction with the target device.

Figure 4:
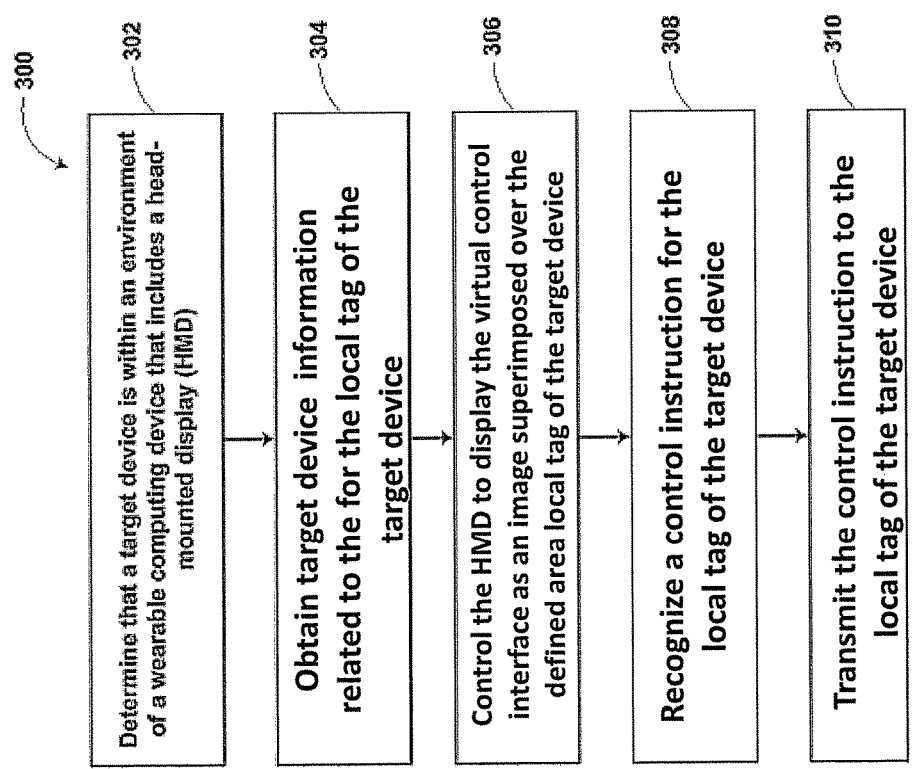
FIG. 4 is a flowchart illustrating a method, in accordance with an example embodiment.

FIG. 4 is a flowchart illustrating an example method 300 for how a wearable computing device that includes a head-mounted display (HMD) may facilitate the wearer's interaction with the programmed local tag 13 of target device 14. The wearable computing device in method 300 may correspond to wearable computing device 10 illustrated in FIG. 1, and the HMD may be configured as illustrated in FIGS. 3A, 3B, and 3C. It is to be understood, however, that the wearable computing device and/or HMD used in method 300 can be configured in other ways.

In this example, method 300 begins with a determination that a programmed local tag 13 of target device 14 is within an environment of a wearable computing device that includes an HMD, as indicated by block 302. The determination can be made by the wearable computing device on its own, or by reviewing information on the programmed local tag 13 of target device 14. Alternatively, the determination can be made by the wearable computing device after sending information to and receiving a response from a server network.

The determination can be made based on information regarding the environment that is obtained by the wearable computing device. In one example, the information regarding the environment includes an image (either a still image or a video image) that is captured by a camera, for example, a camera mounted on the HMD. The wearable computing device may identify the target device from an image analysis of the image obtained by the camera. Alternatively, the wearable computing device may transmit the image to a server network, and the server network may perform the image analysis and transmit back to the wearable computing device information that identifies the programmed local tag 13 of target device 14. Also, the programmed local tag 13 of target device 14 is queried directly.

The identification of the programmed local tag 13 of target device 14 may include an identification of the type of target device. For example, an identification of the target device may be a refrigerator, washing machine, copy machine, thermostat, work of art or historical figure or statue, etc. The identification of the programmed local tag 13 of target device 14 may further identify the make, model, and/or brand of the target device. For example, in the case that the target device is a copy machine, the identification may specify the manufacturer and model number of the target device 14. An identification of a target device can also identify the target device even more specifically by including, for example, a serial number, inventory number, owner, and/or location.

Instead of or in addition to images, the wearable computing device can obtain other types of information about its environment. For example, the wearable computer device may detect a beacon that is transmitted by or on behalf of the programmed local tag 13 of target device 14. The beacon can be, for example, a radio frequency signal, an optical signal, or an ultrasonic signal. By receiving the beacon, the wearable computing device may detect the presence of the programmed local tag 13 of target device 14. In addition, the beacon may include information that identifies the target device (e.g., the type of target device, make, model, etc.). Alternatively, after detecting the presence of programmed local tag 13 of target device 14 by receiving the beacon, the wearable computing may obtain other information (such as an image of the target device or location information) from which the target device can be identified. In another example, the wearable computing device may detect and identify a target device by reading an RFID tag on the target device or by scanning a barcode or QR code on the target device. The wearable computing device may also employ a combination of techniques for target device identification. For example, after determining that programmed local tag 13 of target device 14 is in the vicinity (e.g., by analyzing images or by detecting a beacon), the wearable computing device may scan a barcode or QR code on the target device in order to identify it.

In some examples, the wearable computing device may determine that a target device is nearby based on location, such as the GPS location of the wearable computing device. For example, the location of the wearable computing device may be compared to a database of known locations of target devices. The database can be in the wearable computing device. Alternatively, the database may be in the server network. Thus, the wearable computing device may determine its location, communicate its location to the server network, and receive back identifications of one or more target devices that are in the vicinity of the wearable computing device. For example, the programmed local tag 13 of target device 14 can be deemed to be in the vicinity of the wearable computing device if it is within a defined distance of the wearable computing device. The defined distance could, for example, correspond to a distance that is close enough for a typical wearer to be able to reach out and touch the target device. Alternatively, the defined distance can be a greater distance, for example, correspond to a visual range of a typical wearer. It is to be understood, however, that a wearable computing device may also be used to control programmed local tag 13 of target device 14 that is outside of visual range.

Based on the identification of the programmed local tag 13 of target device 14, the wearable computing device may obtain target device information related to the programmed local tag 13 of target device 14, as indicated by block 304. The programmed local tag 13 of target device 14 can include various kinds of information related to the target device 14. For example, the programmed local tag 13 of target device 14 may include information that defines a virtual control interface for controlling the information of the programmed local tag 13 of target device 14. The programmed local tag 13 of target device 14 may also include information that identifies a defined area of the target device on which the virtual control interface is to be provided. Further, the programmed local tag 13 of target device 14 may include information that describes a visual appearance of the target device and/or the defined area of the target device. That way, the wearable computing may be able to recognize the target device when it is in the wearer's field of view and be able to display the virtual control information as an image that is superimposed over the defined area of the target device in the wearer's field of view.

In addition to or instead of information related to a virtual control of the information of the programmed local tag 13 of target device 14, the programmed local tag 13 of target device 14 may include other information related to the target device 14. For example, the target device 14 information may include instructions for operating the target device 14, as well information defining how and when the instructions are to be displayed. The instructions could include text and/or graphics, and they could be displayed superimposed over the target device 14 in the wearer's field of view or in a different part of the target device's field of view. The instructions could be displayed in conjunction with a virtual control interface or independently of the virtual control interface to control the data associated with the programmed local tag 13 of target device 14. For example, the instructions can be displayable in response to a request from the wearer or in response to a status condition of the target device. In addition to instructions for operating the target device, the target device information can include other information that may be found in a user manual for the target device, such as troubleshooting suggestions, information about obtaining repair service or customer service for the target device, warranty information, etc.

The target device information may also include information that is device specific and/or user specific. For example, the programmed local tag 13 of target device 14 may include current status information regarding the specific target device 14, such as whether the target device is fully operational or in a fault condition. User specific information could include, for example, an access code that the wearer of the wearable computing device may use to operate the target device. User specific information may also include notes, reminders, or other information that the wearer (or someone else) has asked to be associated with the target device. The device specific and/or user specific information can be displayed in conjunction with a virtual control interface for data stored in the programmed local tag 13 of target device 14 or independently of the virtual control interface.

Once the wearable computing device has obtained, through the programmed local tag 13, target device 14 information that defines a virtual control interface, the wearable computing device may control the HMD to display the virtual control information as an image superimposed over the defined area of the target device, as indicated by block 306. In addition to displaying the virtual control interface as an image, the HMD may display other images related to the target device, such as instructions or status information.

The wearable computing device may adjust the size, shape, and orientation of the displayed virtual control interface to match the appearance of the defined area from the perspective of the wearer's field of view. For example, if the defined area is rectangular, but the wearer is looking at the defined area at an angle instead of straight on, then the defined area may appear trapezoidal. The shape of the virtual control interface may then be adjusted so that it fits within the trapezoidal defined area. In addition, the size of the virtual control interface may be adjusted based on the apparent size of the defined area in the wearer's field of view, so as to be smaller when the target device is farther away and larger when the target device is closer. As the wearer moves around, the size, shape, and orientation of the displayed virtual control interface may continue to be adjusted so that it fits within the defined area as seen from the wearer's perspective. In this way, the virtual control interface may be displayed so that it appears to be on the actual surface of the target device in the defined area.

The virtual control interface may initially be displayed in the defined area of the target device, the wearer of the wearable computing device may be able to subsequently adjust the location of the virtual control interface. For example, the wearer may move the virtual control interface to another part of the target device. In some cases, the wearer may be able to move the virtual control interface away from the target device so that it appears as an image superimposed over another object in the field of view or so that the virtual control interface simply "hovers" in the field of view unconnected with any specific object. In other examples, the virtual control interface is "head-fixed" so that it moves with the wearer's head instead of remaining fixed to the target device or other object.

When the virtual control interface is being displayed, the wearable computing device may recognize a control instruction for the information stored on the programmed local tag 13 of target device 14, as indicated by block 308. The control instruction can be an instruction from the wearer of the wearable computing device to control the information on the programmed local tag 13 of target device 14.

In some examples, the control instruction can be recognized from a gesture that indicates an interaction with the virtual control interface. For example, if the virtual control interface includes a virtual button and the wearer's finger moves toward or touches a location of the target device corresponding to the location of the virtual button in the virtual control interface, the wearable computing device may recognize the gesture as a control instruction associated with the virtual button. Other types of gestures can also be recognized as control instructions. For example, motions of the wearer's head may be detected using motion sensors in the HMD (e.g., sensors 28 shown in FIG. 1). An up-and-down motion of the wearer's head may be recognized as a "YES" instruction and a side-to-motion of the wearer's head may be recognized as a "NO" instruction.

Alternatively or additionally, the control instruction can be recognized from input received through a user interface of the wearable computing device. In one example, the user interface includes a touchpad (which may be mounted on the HMD). Thus, the wearable computing device may recognize a touch interaction with the touchpad as corresponding to a control instruction associated with the virtual control interface. In another example, the user interface includes a microphone. Thus, the wearable computing device may recognize a voice command as corresponding to a control instruction associated with the virtual control interface.

The wearable computing device may transmit the control instruction to the information of local tag 13 of target device 14, as indicated by block 310. In some examples, the wearable computing device may transmit the control instruction directly to the target device, for example, using an infrared or Bluetooth link. In other examples, the wearable computing device may transmit the control instruction to the target device via a communication network, such as a wireless local area network (WLAN). In still other examples, the wearable computing device may transmit the control instruction to a server network for subsequent transmission to the target device.

Figure 5:
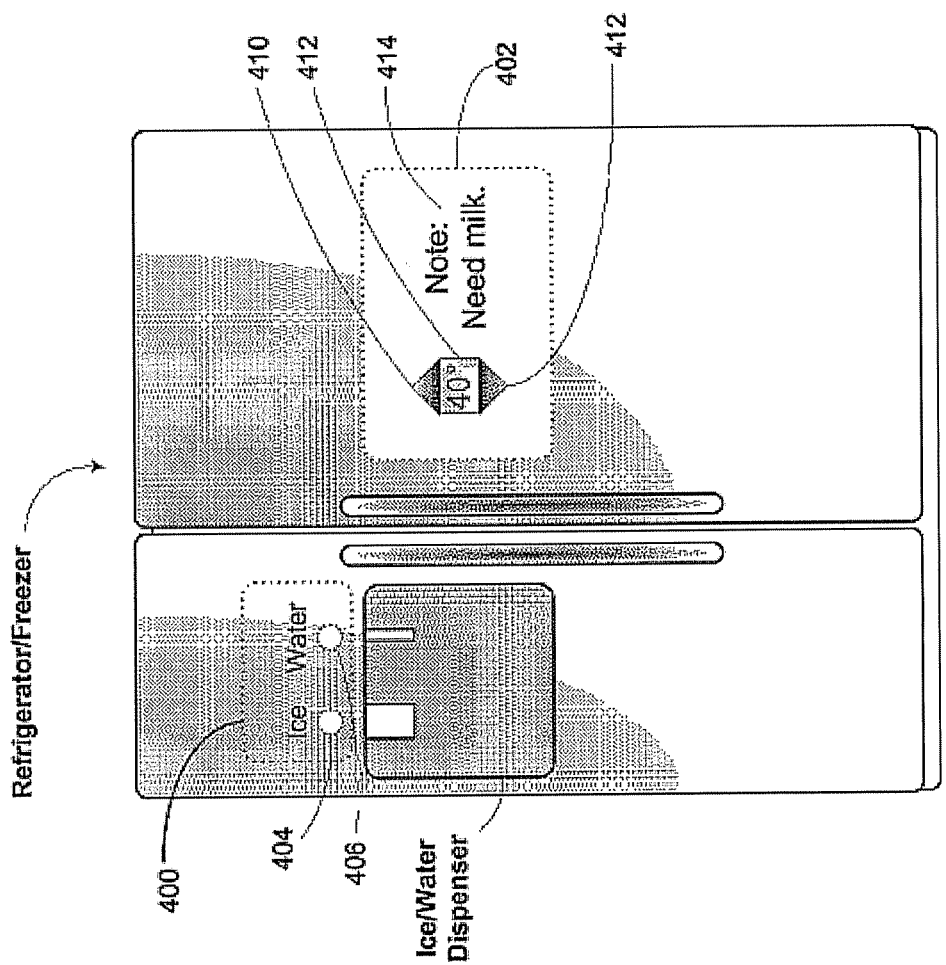
FIG. 5 is a view of a refrigerator/freezer with superimposed virtual control interfaces, in accordance with an example embodiment.

FIG. 5 illustrates an example of how virtual control interfaces may be displayed on a refrigerator/freezer. In particular, FIG. 5 shows what may be visible to a wearer of a wearable computing device with an HMD after the wearable computing device has recognized the refrigerator/freezer as a target device. In this example, a first virtual control interface 400 is displayed on the freezer door above an ice/water dispenser, and a second virtual control interface 402 is displayed on the refrigerator door. FIG. 5 shows the attached programmed local tag 13 that stores the information of the target device 14.

Virtual control interface 400 may be used to control the operation of the ice/water dispenser. As shown in FIG. 5, virtual control interface 400 includes the virtual text "Ice" above a virtual button 404 that is associated with a control instruction for dispensing ice and includes the virtual text "Water" above a virtual button 406 that is associated with a control instruction for dispensing water.

The wearer of the HMD displaying virtual interface 400 may actuate virtual button 404 by a gesture, such as moving a finger toward the location on the freezer door where virtual button 404 appears. The wearable computing device may recognize the gesture as being associated with a control instruction for dispensing ice and transmit the control instruction to the refrigerator/freezer.

In addition to, or instead of being actuated through gestures, virtual buttons 404 and 406 can be actuated in other ways, for example, using a user interface on the wearable computing device. In one example, the wearer may be able to select one of virtual buttons 404 and 406 by a touch interaction with a touchpad, such as a swipe to the left to select virtual button 404 or a swipe to the right to select virtual button 406. Virtual control interface 400 may indicate the selected virtual button by highlighting it in some fashion, such as by an increase in brightness or by a change in color. The wearer may then be able to actuate the selected virtual button by another touch interaction, such as a tap on the touchpad. The touch of the virtual touchpad may lead to more information stored on the programmed local tag 13 of target device 14.

In the example illustrated in FIG. 5, virtual control interface 402 also includes a note 414 that includes the following text: "Need milk". Note 414 can be a user specific message that was established by the wearer of the wearable computing device (or by someone else) as a reminder. It is to be understood that different messages can be displayed at different times. For example, note 414 can be discontinued at some point and/or replaced by a different textual or graphical message. Note 414 can be stored on the wearable computer device or uploaded to the programmed local tag 13 of target device 14.

Figure 6:
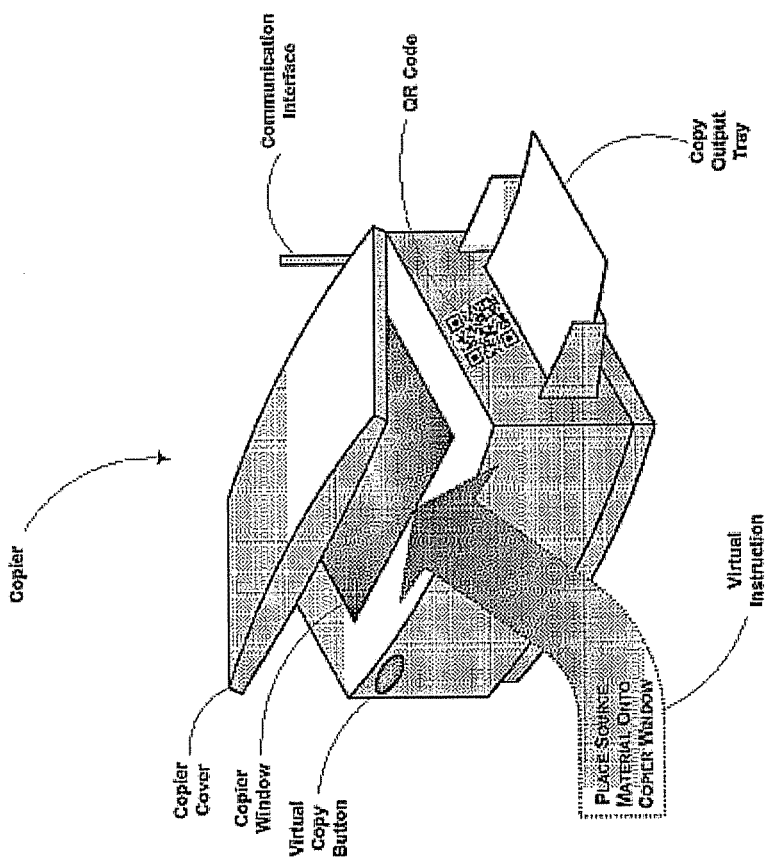
FIG. 6 is a view of a copier in a ready-to-copy state with a superimposed virtual control interface, in accordance with an example embodiment.
Figure 7:
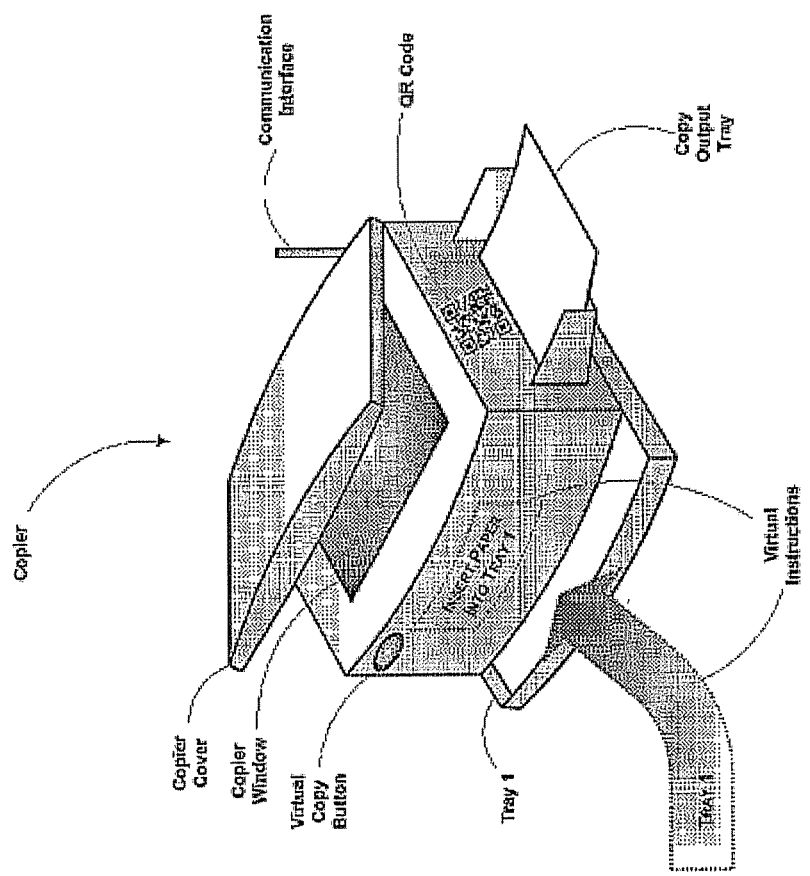
FIG. 7 is a view of a copier in an out-of-paper state with a superimposed virtual control interface, in accordance with an example embodiment.
Figure 8:
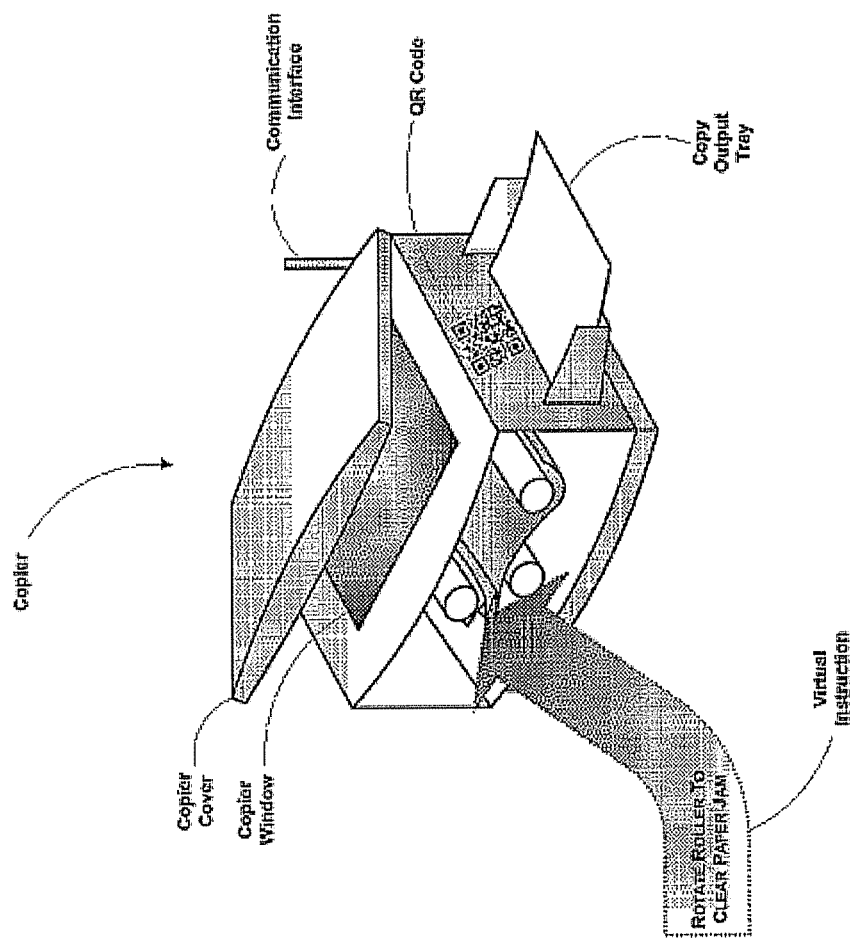
FIG. 8 is a view of a copier in a jammed state with a superimposed virtual control interface, in accordance with an example embodiment.

FIGS. 6, 7, and 8 illustrate how a virtual control interface may be provided for a copier in accordance with the operational state of the copier. As shown in these figures, the copier includes a QR code, which a wearable computing device may use to detect and identify the copier, and a communication interface that allows for two-way communication with the wearer computing device. The communication interface can be a wireless interface, such as a WiFi or Bluetooth interface.

FIG. 6 illustrates an example in which the copier is in a ready-to-copy state. An operational state that the copier may indicate to the wearable computing device using the communication interface. In this operational state, the virtual control interface may include a virtual text instruction. The virtual text instruction includes the following text: "PLACE SOURCE MATERIAL ONTO COPIER WINDOW" within an arrow that indicates the copier window. FIG. 6 shows programmed local tag 13 as the virtual instruction.

FIG. 7 illustrates an example in which the copies needs more paper inserted into Tray 1. When Tray 1 runs out of paper, the wearable computing device may adjust the virtual control interface to display one or more virtual instructions that explain how to fill Tray 1 with paper. As shown in FIG. 7, the virtual instruction includes the text: "INSERT PAPER INTO TRAY 1" and an arrow that indicates Tray 1.

FIG. 8 illustrates an example in which the copier is in a jammed state. When the copier is in a jammed state, the wearable computing device may adjust the virtual control interface to display one or more virtual instructions that explain how to clear the paper jam. As shown in FIG. 8, the virtual instruction includes the text: "ROTATE ROLLER To CLEAR PAPER JAM" and an arrow that indicates the appropriate roller.

A user of the wearable computing device may interact with the virtual control interface in various ways. For example, an up-and-down motion of the wearer's head may be interpreted as a "Yes" that causes the wearable computing device to transmit a signal (such as an RF signal) that opens the garage door. A side-to-side motion of the wearer's head may be interpreted as a "No" that causes the wearable computing device to stop displaying the virtual control interface. Instead of using head motions, the wearer may instruct the wearable computing device to open the garage door in other ways. For example, a gesture of the wearer's finger toward the virtual control interface may be interpreted as a "Yes". Alternatively, the wearer may actuate a button or interact with a touchpad on the wearable computing device to indicate a "Yes". A wearer may also be able to provide a spoken "Yes" or "No" instruction to the wearable computing device.

The wearable computing device may display the virtual control interface in response to an instruction from the wearer. For example, the wearer may instruct the wearable computing device to provide the virtual control interface as the wearer is pulling into the driveway, or even before a garage door is within the wearer's field of view. In this regard, the wearable computing device can be configured to display the virtual control interface so that it is affixed to the garage door, or the virtual control interface can be "head-fixed" so that it is displayed in the wearer's field of view regardless of whether the garage door is also in the wearer's field of view.

The wearable computing device can also display the virtual control interface automatically. For example, the garage door to the wearer's residence can be a known location that is stored in the wearable computing device. When the wearable computing device determines (e.g., using GPS) that is in the vicinity of the garage door's known location, the wearable computing device may begin scanning for a QR code associated with the garage door. Alternatively, the wearable computing device may begin scanning for the QR code after receiving a beacon signal transmitted by the garage door opening or in response to other information.

Figure 9:
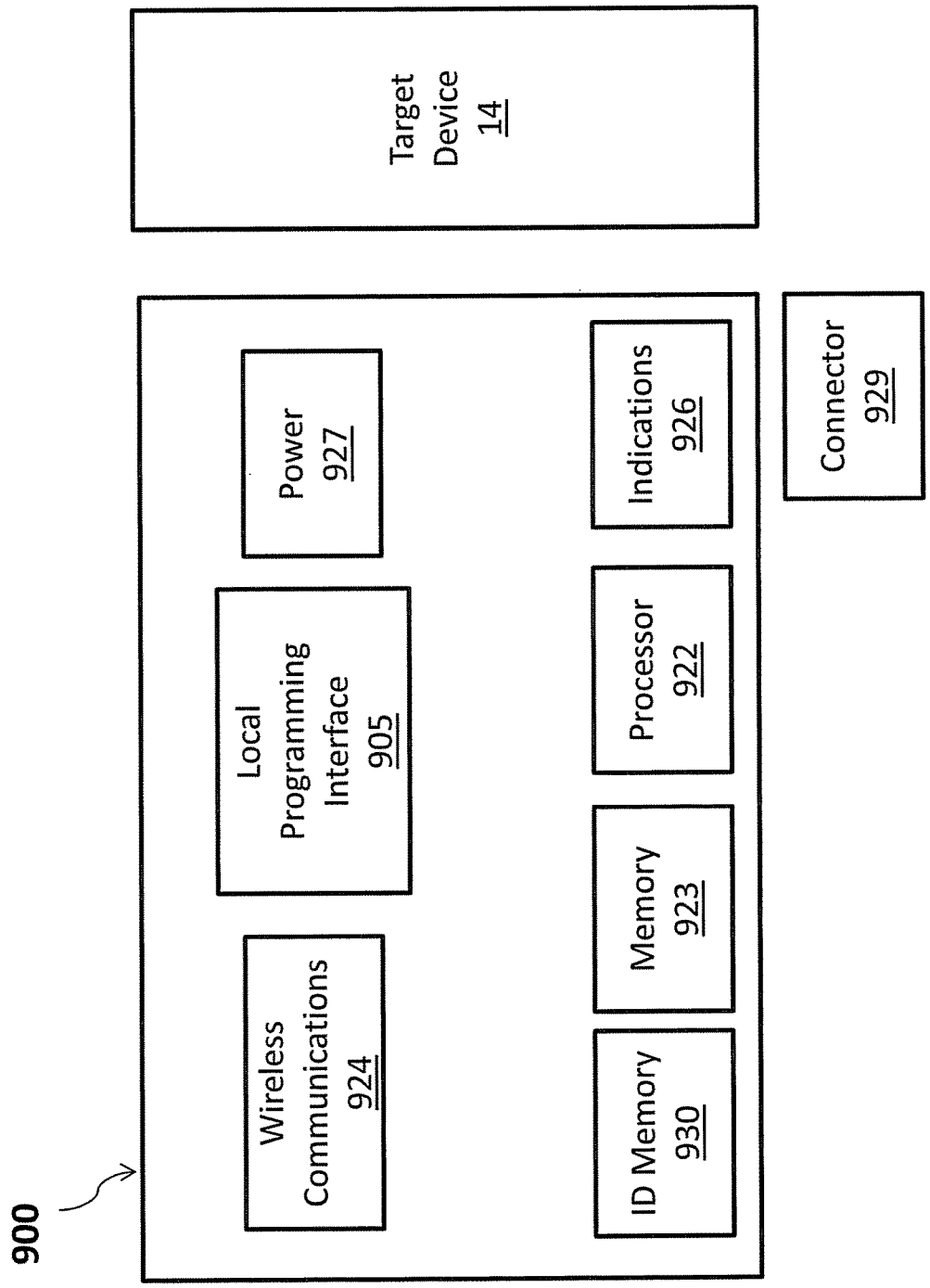
FIG. 9 is a detailed diagram of the programmed local tag.

FIG. 9 shows a description of programmed local tag 13, which is similar to those described in the figures above. Programmed local tag 13 includes ID memory 930 that stores data related to the identification of the target device. ID memory 930 can be ID codes as stored on QR codes, barcodes, RFID codes or can be manufacturer data or even data related to the local tag itself.

Programmed local tag 13 described in the figures above shows wireless communication 924 that allows for communication with an outside wearable computer device. Wireless communication 924 may be WiFi, Blue Tooth, IR, or any other wireless device.

Programmed local tag 13 described in the figures above shows local program interface 905. Program interface 905 includes a hard-wired connection such as serial, parallel, or other hard-wired connection. It can also include an optical hard wired or non-hard wired connection. It can also include any wireless connection. This connection is used for programming programmed local tag 13 either by the user of manufacturer or other third party.

Programmed local tag 13 described in the figures above shows power 927, which is either battery or hard-wired battery power used to power programmed local tag 13.

Programmed local tag 13 described in the figures above is shown and described in FIG. 9, uses memory 923 to store information. The information can be stored in a format that allows the wearable computer to easily access the information and be portrayed in its user interface. It can be stored as any user interface on the internet, which can be hyper-linked based, stored as text, images or audio files, or any other methods.

Programmed local tag 13 described in the figures preferably uses indicators 926 which may have indicator lights for battery power Indicators 926 may also be accessed by a wearable computer, and may be used to indicate a download or upload of data to memory 923, etc. It should be understood that any user need for indicating functionality of programmed local tag 13 can be indicated by indicator 926.

Processor 922 is preferably used to control programmed local tag 13 in terms of communicating with other elements of programmed local tag 13. For example, processor 922 may manage the following: inputs/outputs of the wireless communication 924, local program interface 905, power 927, indicators 926, ID memory 930 and memory 923.

Connector 929 is any physical connector that connects programmed local tag 13 to target device 14. Including but not limited to sticky tape, gum tape, magnets, Velcro, physical screws or hooks, combinations thereof or the like.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for displaying user interfaces via a head-mounted display (HMD), the method comprising:
   capturing images of a location within a real-world environment via a camera, the captured images corresponding to a field of view of the HMD;
   identifying a predefined target area at the location within the real-world environment based on an analysis of the captured images, wherein the identified target area is associated with preprogrammed data;
   generating a mixed display on the HMD in accordance with the preprogrammed data, wherein at least one virtual interface image is superimposed over the field of view of the real-world environment at the location of the identified target area;
   detecting movement of the HMD, wherein the detected movement moves the field of view of the HMD relative to the real-world environment; and
   updating the mixed display on the HMD based on the detected movement, wherein the at least one virtual interface image appears affixed to the location of the identified target area within the real-world environment.

2. The method of claim 1, wherein the identified target area corresponds to an object located in the real-world environment.

3. The method of claim 1, further comprising directing the mixed display to a single eye of a user.

4. The method of claim 1, wherein a size of the at least one virtual interface image is based on a distance between the HMD and the predefined target area.

5. The method of claim 1, wherein at least one other virtual interface image remains within a field of view of the HMD when the HMD is moved.

6. The method of claim 1, wherein the at least one virtual interface image includes one or more interface elements each corresponding to a different action executable by the HMD.

7. The method of claim 6, further comprising receiving user input indicating a selection of at least one of the interface elements.

8. The method of claim 7, wherein receiving the user input includes capturing a gesture by the camera.

9. The method of claim 7, wherein receiving the user input includes capturing a voice command by a microphone.

10. A wearable computing device for displaying user interfaces via a head-mounted display (HMD), the device comprising:
    a camera that captures images of a location within a real-world environment, the captured images corresponding to a field of view of the HMD;
    a controller that executes instructions stored in memory to:
       identify a predefined target area at the location within the real-world environment based on an analysis of the captured images, wherein the identified target area is associated with preprogrammed data,
       generate a mixed display on the HMD in accordance with the preprogrammed data, wherein at least one virtual interface image is superimposed over the field of view of the real-world environment at the location of the identified target area,
       detect movement of the HMD, wherein the detected movement moves the field of view of the HMD relative to the real-world environment, and
       update the mixed display on the HMD based on the detected movement, wherein the at least one virtual interface image appears affixed to the location of the identified target area within the real-world environment; and
    the HMD that includes a display panel that displays the mixed display.

11. The device of claim 10, wherein the predefined target area corresponds to an object located within the real-world environment.

12. The device of claim 10, wherein the HMD directs the mixed display to a single eye of a user.

13. The device of claim 11, wherein a size of the at least one virtual interface image is based on a distance between the HMD and the predefined target area.

14. The device of claim 10, wherein at least one other virtual interface image remains within a field of view of the HMD when the HMD is moved.

15. The device of claim 10, wherein the at least one virtual interface image includes one or more interface elements each corresponding to a different actions executable by the HMD.

16. The device of claim 15 wherein the controller further receives user input indicating a selection of at least one of the interface elements.

17. The device of claim 16, further comprising a camera that captures the user input as a gesture.

18. The device of claim 16, further comprising a microphone that captures the user input as a voice command.

19. A non-transitory computer-readable storage medium having embodied thereon a program, the program being executable by a processor to perform a method for displaying user interfaces via a head-mounted display (HMD), the method comprising:
    capturing images of a location within a real-world environment via a camera, the captured images corresponding to a field of view of a head-mounted display HMD;
    identifying a predefined target area at the location within the real-world environment based on an analysis of the captured images, wherein the identified target area is associated with preprogrammed data;
    generating a mixed display on the HMD in accordance with the preprogrammed data, wherein at least one virtual interface image is superimposed over the field of view of the real-world environment at the location of the identified target area;
    detecting movement of the HMD, wherein the detected movement moves the field of view of the HMD relative to the real-world environment; and
    updating the mixed display on the HMD based on the detected movement, wherein the at least one virtual interface image appears affixed to the location of the identified target area within the real-world environment.

* * * * *